(12) United States Patent
Jia et al.

(10) Patent No.: US 8,169,113 B2
(45) Date of Patent: May 1, 2012

(54) MOTOR OPERATING AT TWO DIFFERENT VOLTAGES

(75) Inventors: Hongyu Jia, Zhongshan (CN); Yongjun Mi, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 232 days.

(21) Appl. No.: 12/767,027

(22) Filed: Apr. 26, 2010

(65) Prior Publication Data

US 2010/0270880 A1    Oct. 28, 2010

(30) Foreign Application Priority Data

Apr. 28, 2009   (CN) ...................... 2009 2 0055892 U (51) Int. Cl.
*H01R 29/00* (2006.01)
*H02K 5/22* (2006.01)
(52) U.S. Cl. ............................. 310/71; 439/148; 439/528
(58) Field of Classification Search ................... 310/71; 361/636; 439/52–54, 148, 528
See application file for complete search history.

(56) References Cited

U.S. PATENT DOCUMENTS

| | | | | |
|---|---|---|---|---|
| 1,754,645 A * | 4/1930 | Oswald | .......................... | 439/189 |
| 1,902,954 A * | 3/1933 | Hochfeld | ...................... | 310/158 |
| 2,094,386 A * | 9/1937 | Veinott | ........................... | 361/26 |
| 2,321,999 A * | 6/1943 | Dalton | .......................... | 307/149 |
| 2,531,719 A * | 11/1950 | Alvino | .......................... | 318/296 |
| 2,874,317 A * | 2/1959 | Couse | ............................ | 310/71 |
| 2,922,054 A * | 1/1960 | Miller | ............................ | 310/71 |
| 3,231,767 A * | 1/1966 | Powell | ........................... | 310/71 |
| 3,353,139 A * | 11/1967 | Ribbelink | ...................... | 439/49 |
| 3,453,403 A * | 7/1969 | Hoffman | .................... | 200/51 R |
| 3,602,748 A * | 8/1971 | Locke | ............................ | 310/71 |
| 3,983,428 A * | 9/1976 | Bitsch et al. | ..................... | 310/71 |
| 4,547,689 A * | 10/1985 | Tsuchimoto et al. | ........... | 310/71 |
| 5,017,818 A * | 5/1991 | Dohogne | ........................ | 310/71 |
| 6,040,646 A * | 3/2000 | Peters | ............................ | 310/71 |
| 6,048,219 A * | 4/2000 | Kotowski | ...................... | 439/221 |
| 6,873,131 B1 * | 3/2005 | Watkins | ......................... | 318/782 |
| 6,882,070 B2 * | 4/2005 | Staigl et al. | ..................... | 310/71 |

\* cited by examiner

*Primary Examiner* — Burton Mullins
(74) *Attorney, Agent, or Firm* — Matthias Scholl P.C.; Matthias Scholl (57) ABSTRACT

A motor operating at two different voltages, containing at least: a stator, a rotor, multiple coil windings, a housing, a patch board, a connector socket having a terminal cap, a first plug, a second plug, and a base. The patch board is disposed on the housing. The connector socket, the first plug, and the base are disposed on the patch board. The terminal cap is disposed in the connector socket. The coil winding is directly electrically connected to the terminal cap. The first plug is inserted in the connector socket whereby connecting two in-phase coil windings in parallel. The second plug is disposed on the base as the motor operates at a low voltage, and the second plug is inserted in the connector socket whereby connecting two in-phase coil windings in series. The first plug is disposed on the base as the motor operates at a high voltage.

11 Claims, 10 Drawing Sheets

MOTOR OPERATING AT TWO DIFFERENT VOLTAGES

CROSS-REFERENCE TO RELATED APPLICATIONS

Pursuant to 35 U.S.C.§119 and the Paris Convention Treaty, this application claims the benefit of Chinese Patent Application No. 200920055892.X filed on Apr. 28, 2009, the contents of which are incorporated herein by reference.

BACKGROUND OF THE INVENTION

1. Field of the Invention

The invention relates to a motor, and more particularly to a motor operating at two different voltages.

2. Description of the Related Art

Nowadays motors operating at two different voltages are widely used in industries. However, there are several problems with the conventional motors: structure thereof is complex, use thereof is inconvenient, and erroneous connection often occurs during switching between two different voltages, which causes damage to the motors.

SUMMARY OF THE INVENTION

In view of the above-described problem, it is one objective of the invention to provide a motor operating at two different voltages that features simple structure, convenient use, no erroneous connection during switching between two different voltages, and high reliability.

To achieve the above objectives, in accordance with one embodiment of the invention, provided is a motor operating at two different voltages, comprising a stator, a rotor, multiple coil windings, a housing, a patch board, a connector socket having a terminal cap, a first plug, a second plug, and a base. The patch board is disposed on the housing, the connector socket, the first plug, and the base are disposed on the patch board, the terminal cap is disposed in the connector socket, the coil winding is electrically connected to the terminal cap, the first plug is inserted in the connector socket whereby parallel connecting two in-phase coil windings, and the second plug is disposed on the base as the motor operates at a low voltage, and the second plug is inserted in the connector socket whereby serially connecting two in-phase coil windings, and the first plug is disposed on the base as the motor operates at a high voltage.

In a class of this embodiment, multiple rows of first plugholes are distributed on the connector socket, the terminal cap is disposed in the first plughole, and both ends of the coil winding are electrically connected to the terminal cap.

In a class of this embodiment, the first plug comprises multiple rows of first posts.

the first post has a first groove, a first terminal is disposed in the first groove, the first post is disposed in the first plughole, and the first terminal is connected to the terminal cap.

In a class of this embodiment, the second plug comprises multiple rows of second posts, the second post has a second groove, a second terminal is disposed in the second groove, the second post is disposed in the first plughole, and the second terminal is connected to the terminal cap.

In a class of this embodiment, the number of the first plugholes is the same as that of the first posts and that of the second posts, and positions of the first plugholes correspond to those of the first posts and those of the second posts.

In a class of this embodiment, the first plugholes are distributed in an array of four rows and three columns.

In a class of this embodiment, multiple rows of second plugholes are disposed on the base, and the first posts and the second posts can be received in the second plugholes.

In a class of this embodiment, the coil windings comprise multiple A-phase coil windings, B-phase coil windings, and C-phase coil windings, the A-phase coil winding comprises a pair of sub-windings A1 and A2, the B-phase coil winding comprises a pair of sub-windings B1 and B2, and the C-phase coil winding comprises a pair of sub-windings C1 and C2.

In a class of this embodiment, an end A11 of the sub-winding A1 and an end A21 of the sub-winding A2 are on the same column, the other end A12 of the sub-winding A1 and the other end A22 of the sub-winding A2 are on the same column, an end B11 of the sub-winding B1 and an end B21 of the sub-winding B2 are on the same column, the other end B12 of the sub-winding B1 and the other end B22 of the sub-winding B2 are on the same column, an end C11 of the sub-winding C1 and an end C21 of the sub-winding C2 are on the same column, and the other end C12 of the sub-winding C1 and the other end C22 of the sub-winding C2 are on the same column.

In a class of this embodiment, the first terminals on the first row and the second row of the first plug are connected altogether via a wire, and the first terminals on the third row and the fourth row of the first plug are connected altogether via the wire In a class of this embodiment, the second terminals on the second row and the third row of the second plug are connected altogether via the wire.

Advantages of the invention comprise: 1) by inserting the first plug or the second plug in the connector socket, two in-phase coil windings are serially connected or parallel connected, whereby enabling the motor to operate at two different voltages, and to feature simple structure, wider application, and convenient use; 2) the number of the first plugholes is the same as that of the first posts and that of the second posts, positions of the first plugholes correspond to those of the first posts and those of the second posts, and operating voltages are respectively marked on the first plug and the second plug, which enable the motor to feature convenient use, no erroneous connection, high reliability, and simple structure; 3) the first plugholes are distributed in an array of four rows and three columns, which enables the motor to have simple structure and reasonable distribution.

DETAILED DESCRIPTION OF THE EMBODIMENTS

Detailed description will be given below in conjunction with accompanying drawings.

Figure 1:
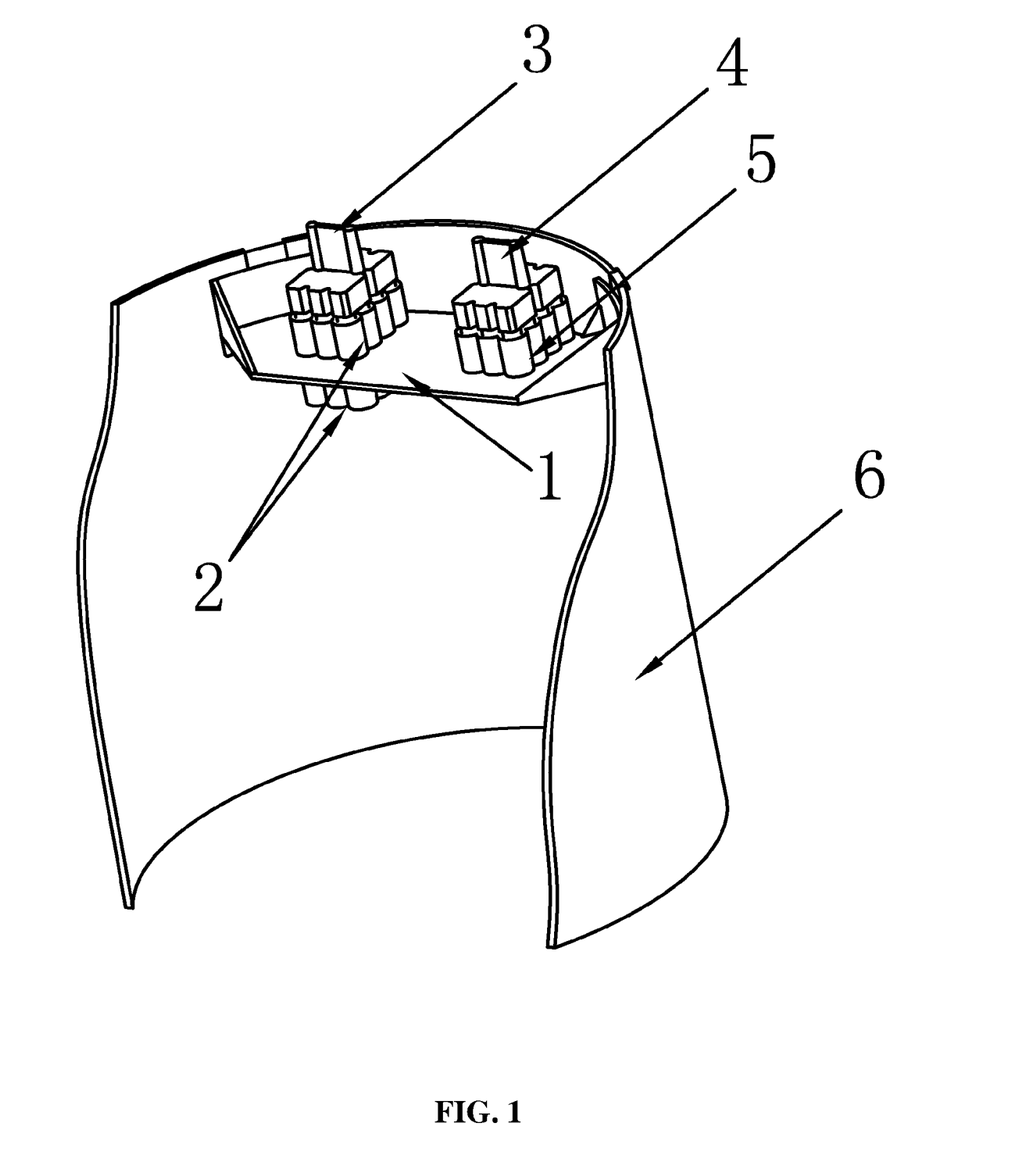
FIG. 1 is a schematic diagram of a motor operating at one voltage of an exemplary embodiment of the invention.
Figure 2:
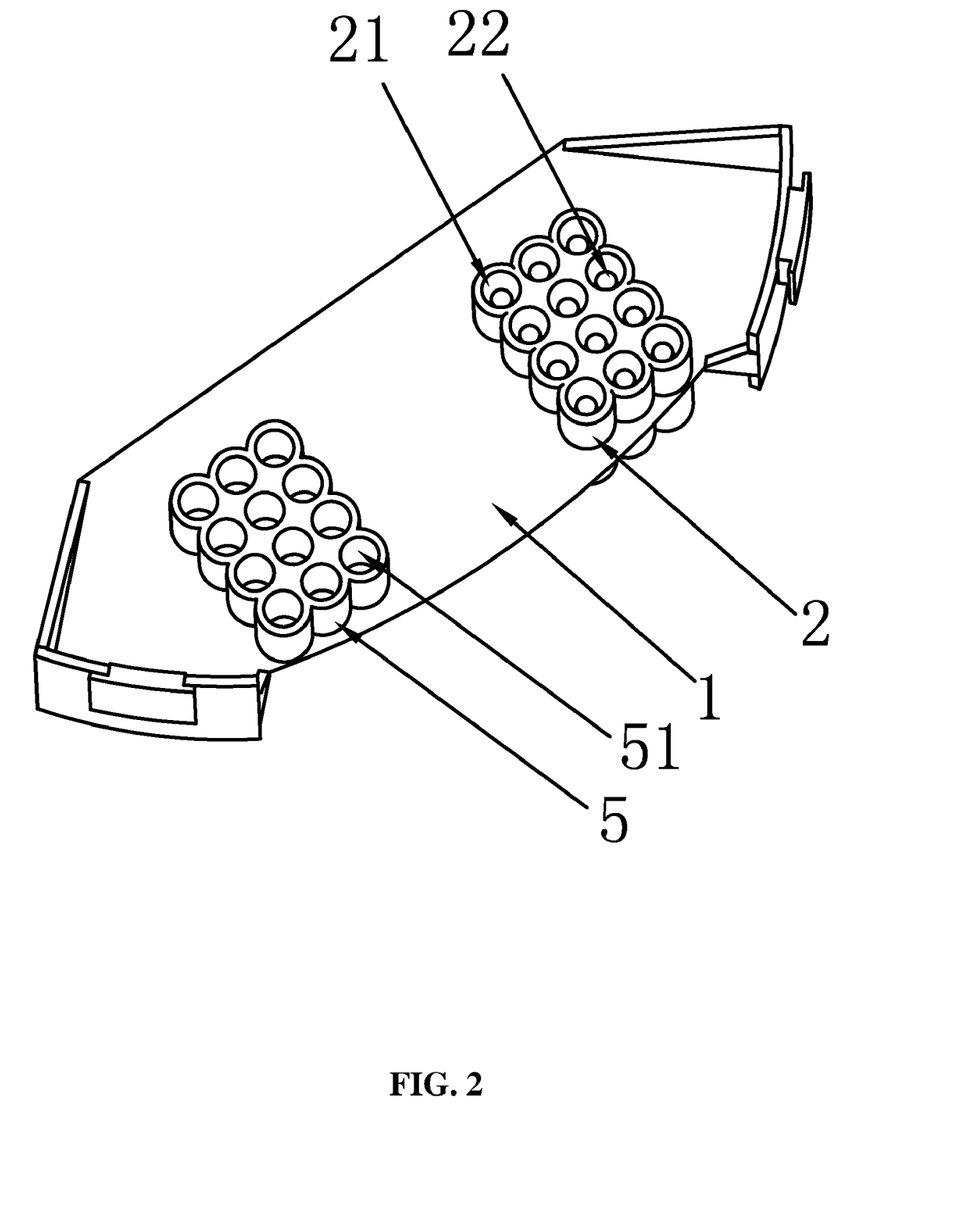
FIG. 2 is a schematic diagram of a patch board.
Figure 3:
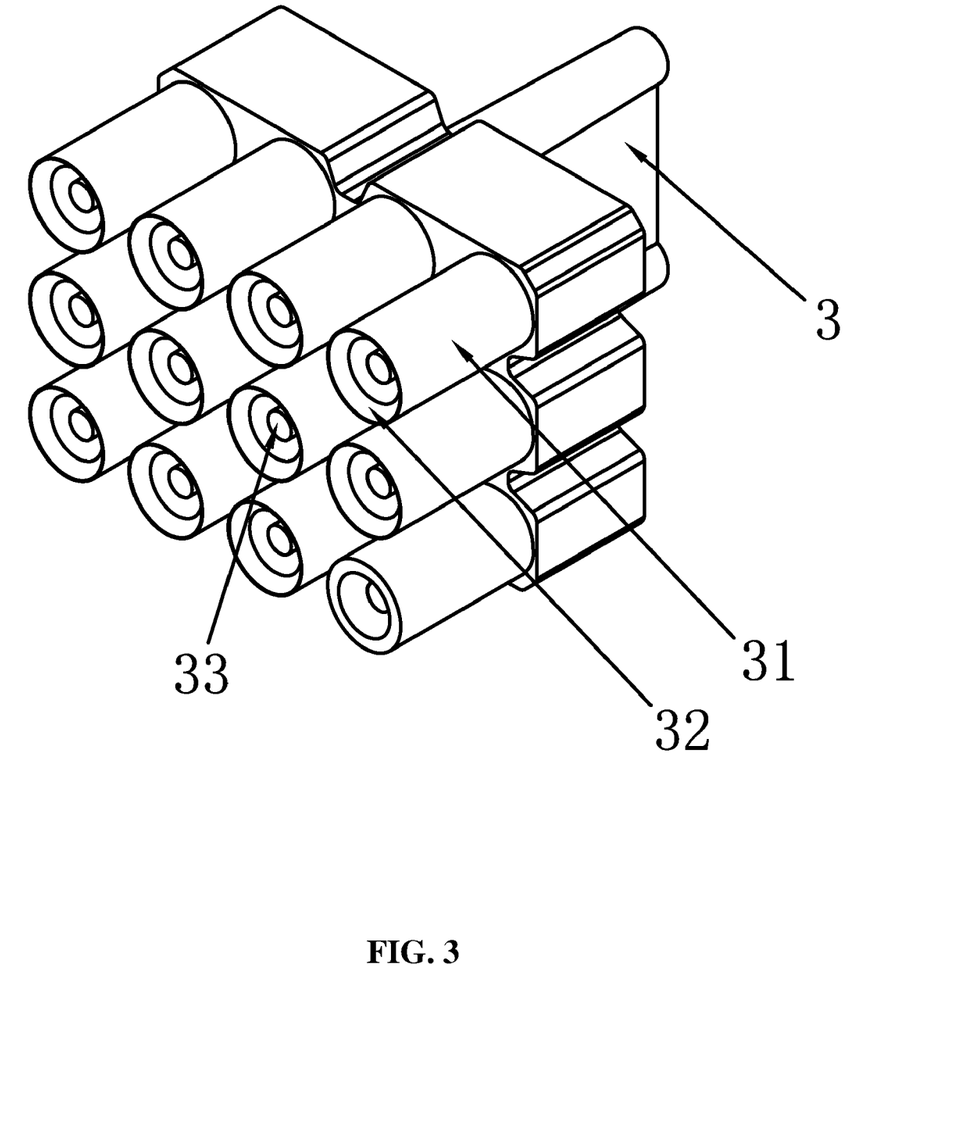
FIG. 3 is a schematic diagram of a first plug.
Figure 4:
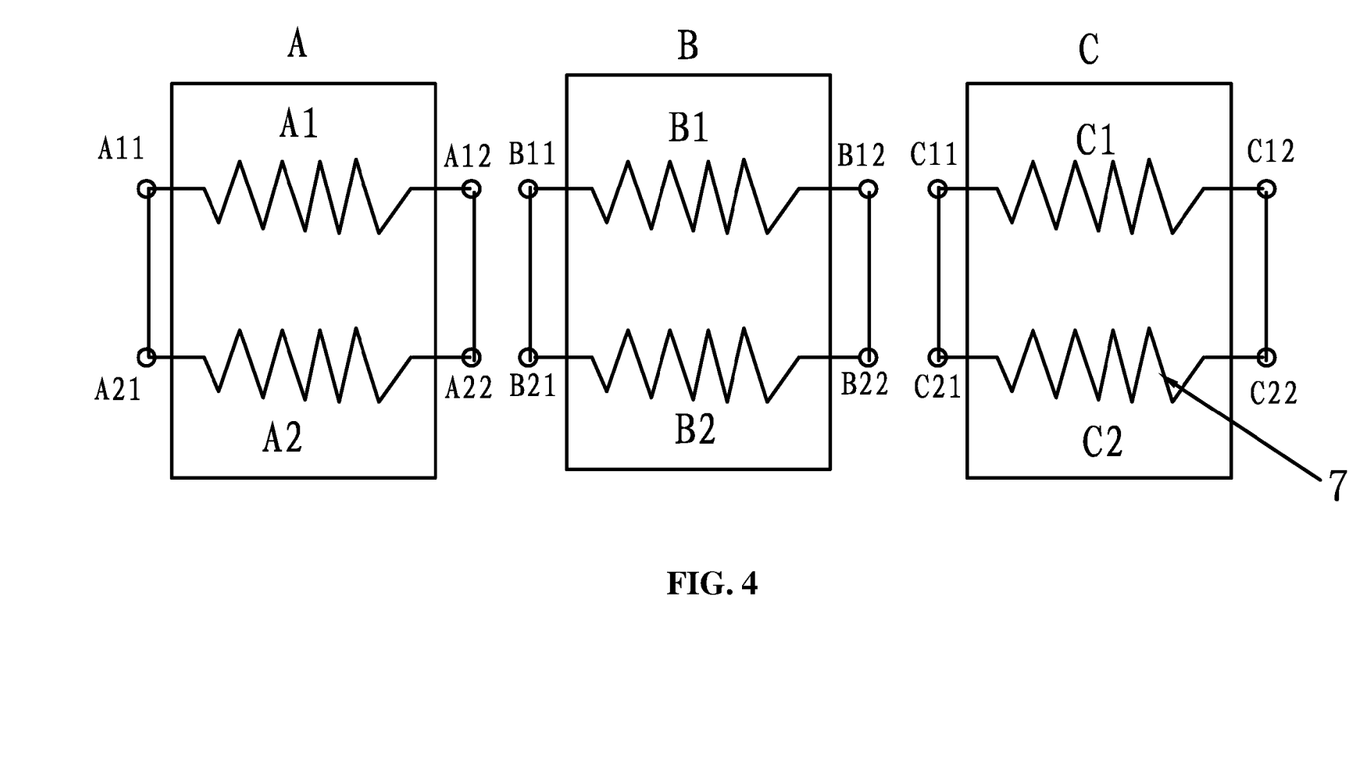
FIG. 4 illustrates coil windings of a first plug.
Figure 5:
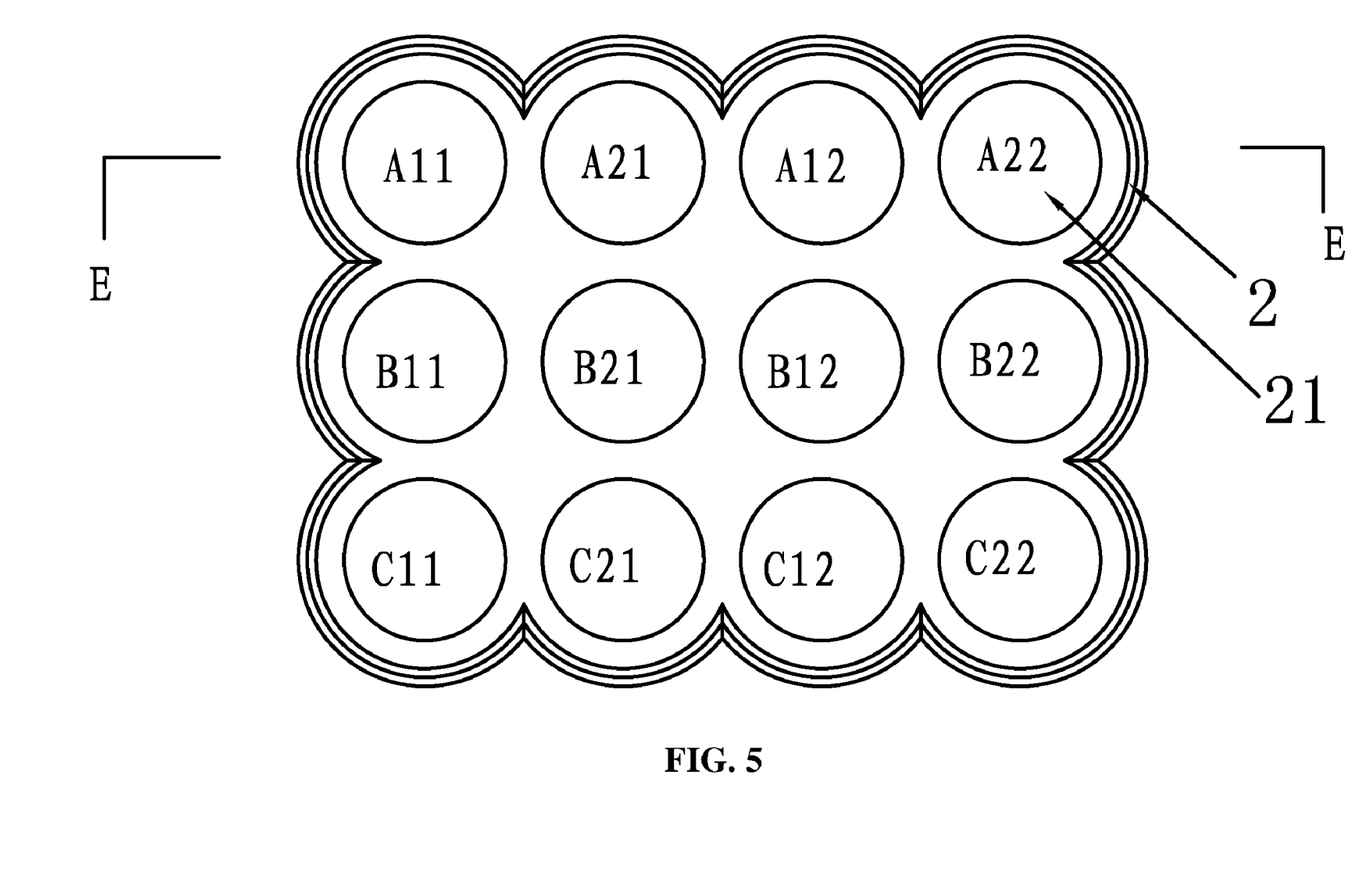
FIG. 5 illustrates connection between a plughole and a coil winding.
Figure 6:
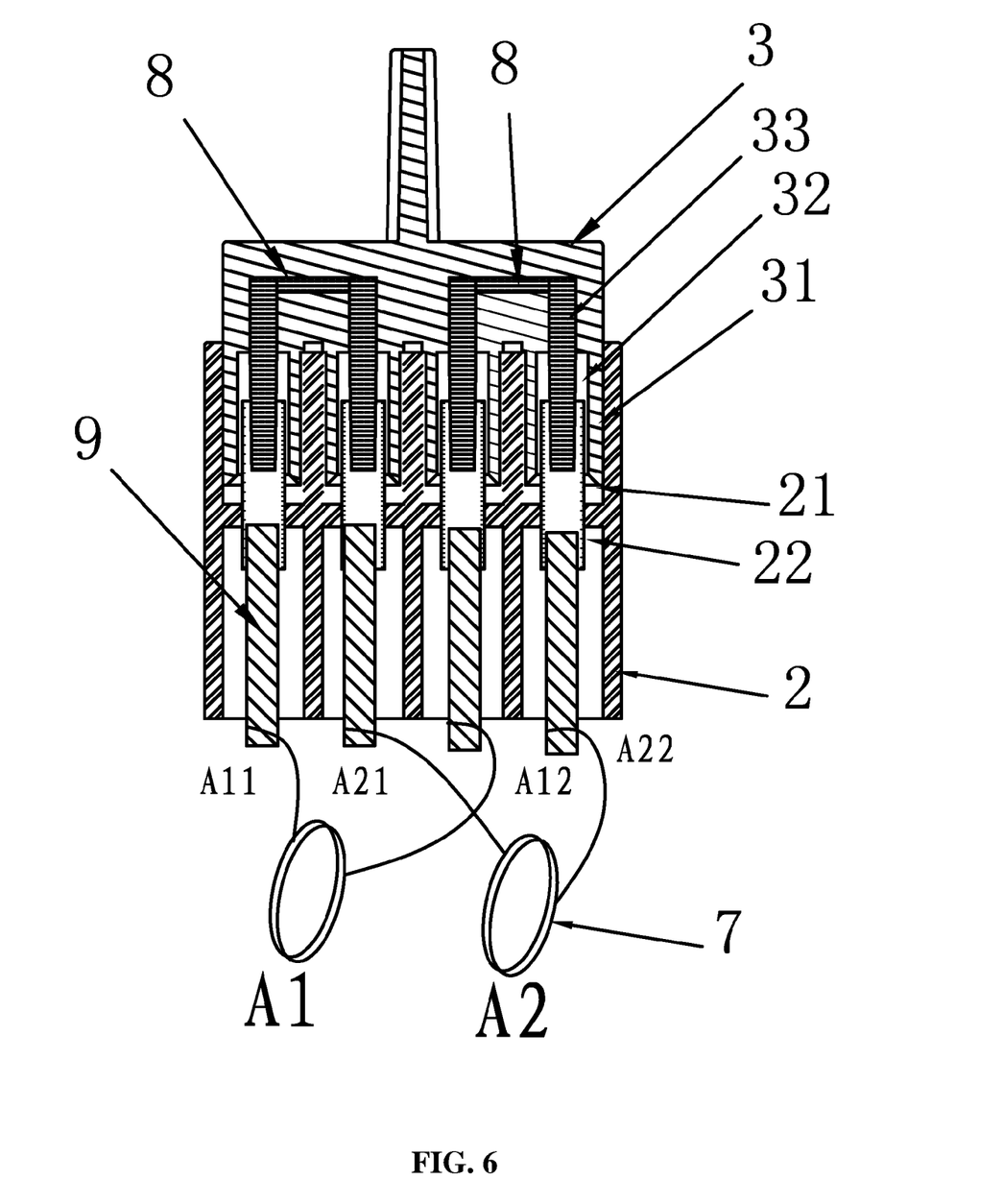
FIG. 6 is a cross-sectional view of a first plug and a connector socket along a line E-E in FIG. 5.
Figure 7:
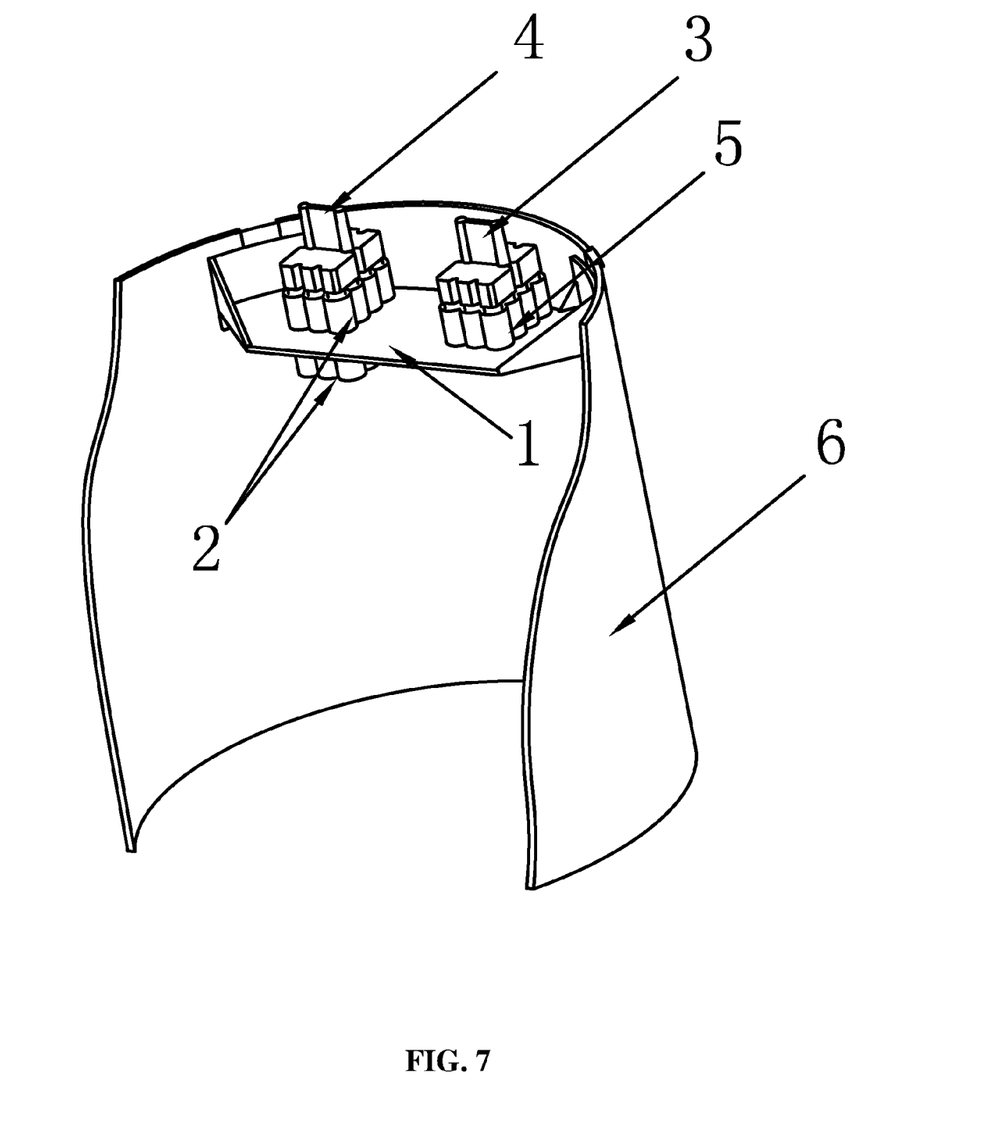
FIG. 7 is a schematic diagram of a motor operating at another voltage of another exemplary embodiment of the invention.
Figure 8:
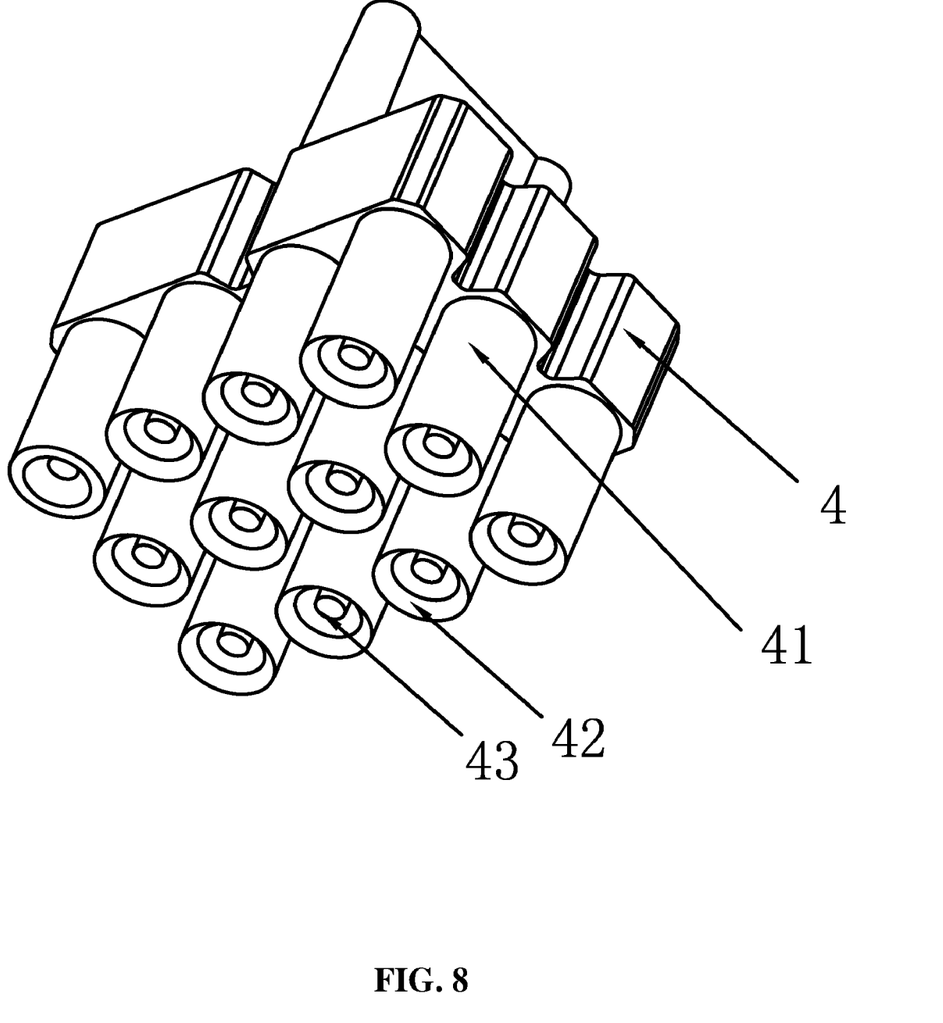
FIG. 8 a schematic diagram of a second plug.
Figure 9:
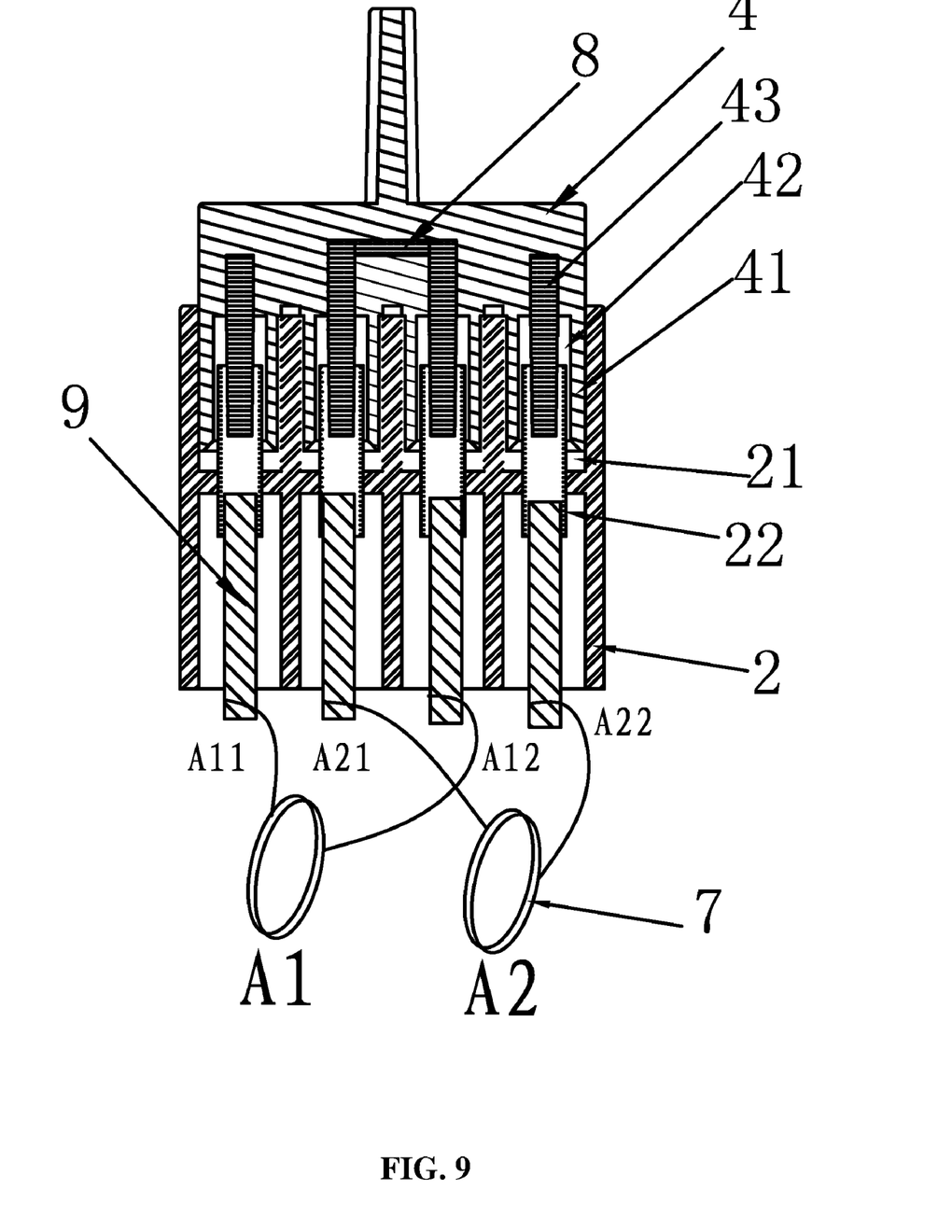
FIG. 9 is a cross-sectional view of a second plug and a connector socket.
Figure 10:
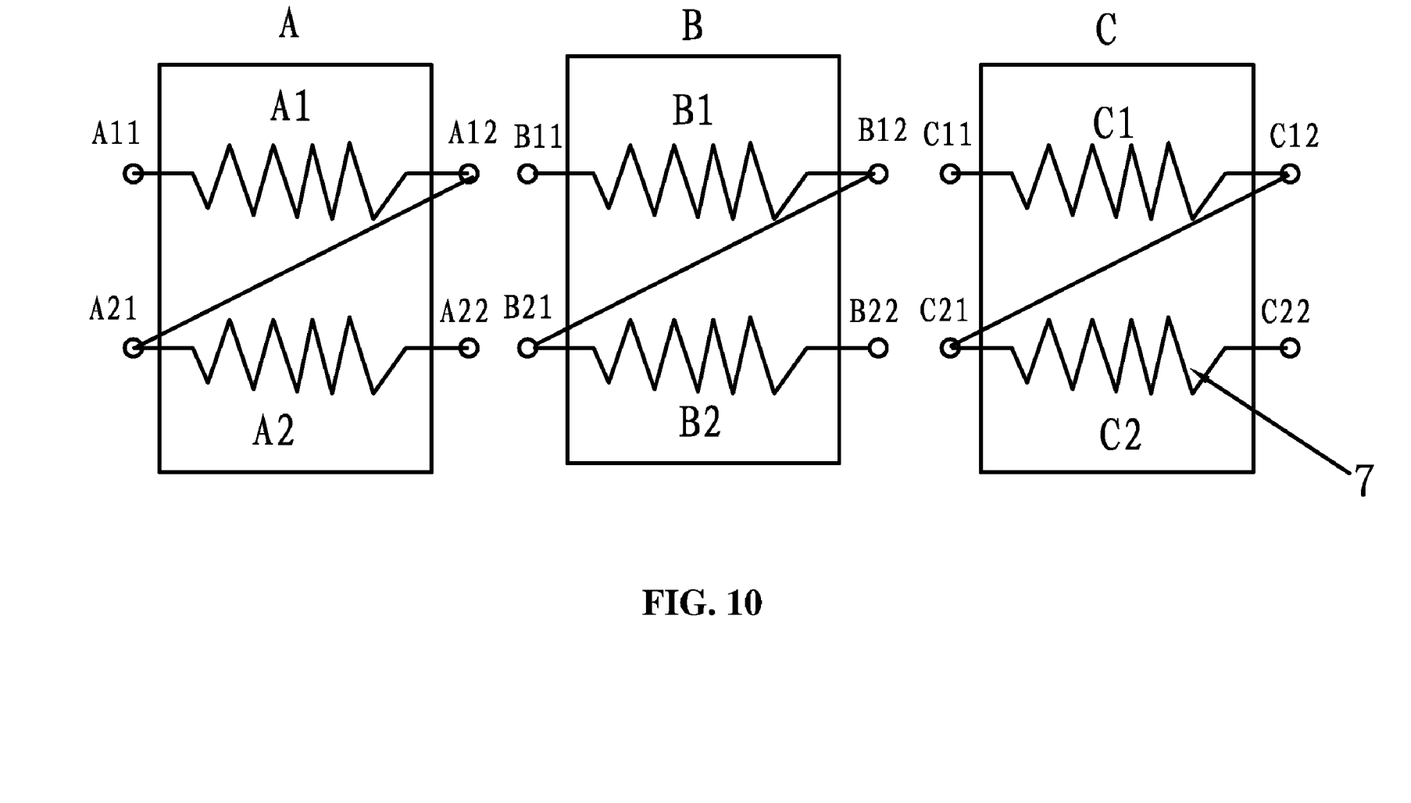
FIG. 10 illustrates coil windings of a second plug.

As shown in FIGS. 1-10, a motor operating at two different voltages of the invention comprises a stator, a rotor, multiple coil windings 7, a housing 6, a patch board 1, a connector socket 2 having a terminal cap 22, a first plug 3, a second plug 4, and a base 5. The patch board 1 is disposed on the housing 6, the connector socket 2, the first plug 3, and the base 5 are disposed on the patch board 1, the terminal cap 22 is disposed in the connector socket 2, and the coil winding 7 is electrically connected to the terminal cap 22, As the motor operates at a low voltage, the first plug 3 is inserted in the connector socket 2 whereby parallel connecting two in-phase coil windings 7, and the second plug 4 is disposed on the base 5.

As the motor operates at a high voltage, the second plug 4 is inserted in the connector socket 2 whereby serially connecting two in-phase coil windings 7, and the first plug 3 is disposed on the base 5.

Both ends of the coil winding 7 are connected to a terminal 9, and the terminal 9 is received in the terminal cap 22.

Multiple rows of first plugholes 21 are distributed on the connector socket 2, the terminal cap 22 is disposed in the first plughole 21, and both ends of the coil winding 7 are electrically connected to the terminal cap 22.

The first plug 3 comprises multiple rows of first posts 31, the first post 31 has a first groove 32, a first terminal 33 is disposed in the first groove 32, the first post 31 is disposed in the first plughole 21, and the first terminal 33 is connected to the terminal cap 22.

The second plug 4 comprises multiple rows of second posts 41, the second post 41 has a second groove 42, a second terminal 43 is disposed in the second groove 42, the second post 41 is disposed in the first plughole 21, and the second terminal 43 is connected to the terminal cap 22.

The number of the first plugholes 21 is the same as that of the first posts 31 and that of the second posts 41, and positions of the first plugholes 21 correspond to those of the first posts 31 and those of the second posts 41.

In this embodiment, the first plugholes 21 are distributed in an array of four rows and three columns.

Multiple rows of second plugholes 51 are disposed on the base 5, and the first posts 31 and the second posts 41 can be received in the second plugholes 51.

As shown in FIGS. 1-6, the first plug 3 is inserted in the connector socket 2, and the second plug 4 is disposed on the base 5. The motor of the invention is a three-phase AC motor.

The coil windings 7 comprise multiple A-phase coil windings, B-phase coil windings, and C-phase coil windings, the A-phase coil winding comprises a pair of sub-windings A1 and A2, the B-phase coil winding comprises a pair of sub-windings B1 and B2, and the C-phase coil winding comprises a pair of sub-windings C1 and C2. An end A11 of the sub-winding A1 and an end A21 of the sub-winding A2 are on the same column, the other end A12 of the sub-winding A1 and the other end A22 of the sub-winding A2 are on the same column, an end B11 of the sub-winding B1 and an end B21 of the sub-winding B2 are on the same column, the other end B12 of the sub-winding B1 and the other end B22 of the sub-winding B2 are on the same column, an end C11 of the sub-winding C1 and an end C21 of the sub-winding C2 are on the same column, and the other end C12 of the sub-winding C1 and the other end C22 of the sub-winding C2 are on the same column. As the first plug 3 is inserted in the connector socket 2, the first terminals 33 on the first row and the second row of the first plug 3 are connected altogether via a wire 8, and the first terminals 33 on the third row and the fourth row of the first plug 3 are connected altogether via the wire 8 so that two in-phase coil windings are parallel connected. At this time, the motor operates at a low voltage such as 230V.

As shown in FIGS. 7-10, the second plug 4 is inserted in the connector socket 2, and the first plug 3 is disposed on the base 5. The motor of the invention is a three-phase AC motor.

The coil windings 7 comprise multiple A-phase coil windings, B-phase coil windings, and C-phase coil windings, the A-phase coil winding comprises a pair of sub-windings A1 and A2, the B-phase coil winding comprises a pair of sub-windings B1 and B2, and the C-phase coil winding comprises a pair of sub-windings C1 and C2. An end A11 of the sub-winding A1 and an end A21 of the sub-winding A2 are on the same column, the other end A12 of the sub-winding A1 and the other end A22 of the sub-winding A2 are on the same column, an end B11 of the sub-winding B1 and an end B21 of the sub-winding B2 are on the same column, the other end B12 of the sub-winding B1 and the other end B22 of the sub-winding B2 are on the same column, an end C11 of the sub-winding C1 and an end C21 of the sub-winding C2 are on the same column, and the other end C12 of the sub-winding C1 and the other end C22 of the sub-winding C2 are on the same column. The second terminals 43 on the second row and the third row of the second plug 4 are connected altogether via the wire 8 so that two in-phase coil windings are serially connected. At this time, the motor operates at a high voltage such as 460V.

Operation principle of the invention is: each one of the A-phase coil winding, the B-phase coil winding, and the C-phase coil winding comprises two sub-windings, and thus four connecting positions are formed. Therefore, for the three-phase coil winding, twelve connecting positions are formed. The terminal caps 22 in the connector socket 2 are distributed in an array of four rows and three columns, and correspond to the coil windings 7. As the first plug 3 is inserted in the connector socket 2, two in-phase coil windings are parallel connected via the first plug 3, and the motor operates at a low voltage of 230V. As the second plug 4 is inserted in the connector socket 2, two in-phase coil windings are serially connected via the second plug 4, and the motor operates at a high voltage of 460V. The invention features convenient use, wide application, and high reliability.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor operating at two different voltages, comprising
a stator;
a rotor;
multiple coil windings (7);
a housing (6);
a patch board (1);
a connector socket (2) having a terminal cap (22);
a first plug (3);
a second plug (4); and
a base (5);
wherein
said patch board (1) is disposed on said housing (6);
said connector socket (2), said first plug (3), and said base (5) are disposed on said patch board (1);
said terminal cap (22) is disposed in said connector socket (2);
said coil windings (7) are electrically connected to said terminal cap (22);

as said motor operates at a low voltage: said first plug (3) is inserted in said connector socket (2) whereby connecting two in-phase coil windings (7) in parallel and said second plug (4) is disposed on said base (5); and as said motor operates at a high voltage: said second plug (4) is inserted in said connector socket (2) whereby connecting two in-phase coil windings (7) in series and said first plug (3) is disposed on said base (5).

2. The motor of claim 1, wherein
multiple rows of first plugholes (21) are distributed on said connector socket (2);
said terminal cap (22) is disposed in said first plughole (21); and
both ends of said coil winding (7) are electrically connected to said terminal cap (22).

3. The motor of claim 2, wherein said first plug (3) comprises multiple rows of first posts (31);
said first post (31) has a first groove (32);
a first terminal (33) is disposed in said first groove (32);
said first post (31) is disposed in said first plughole (21); and
said first terminal (33) is connected to said terminal cap (22).

4. The motor of claim 3, wherein
said second plug (4) comprises multiple rows of second posts (41);
said second post (41) has a second groove (42);
a second terminal (43) is disposed in said second groove (42);
said second post (41) is disposed in said first plughole (21); and
said second terminal (43) is connected to said terminal cap (22).

5. The motor of claim 4, wherein
the number of said first plugholes (21) is the same as that of said first posts (31) and that of said second posts (41); and
positions of said first plugholes (21) correspond to those of said first posts (31) and those of said second posts (41).

6. The motor of claim 5, wherein said first plugholes (21) are distributed in an array of four rows and three columns.

7. The motor of claim 5, wherein
multiple rows of second plugholes (51) are disposed on said base (5); and
said first posts (31) and said second posts (41) can be received in said second plugholes (51).

8. The motor of claim 7, wherein
said coil windings (7) comprise multiple A-phase coil windings, B-phase coil windings, and C-phase coil windings;
said A-phase coil winding comprises a pair of sub-windings A1 and A2;
said B-phase coil winding comprises a pair of sub-windings B1 and B2; and
said C-phase coil winding comprises a pair of sub-windings C1 and C2.

9. The motor of claim 8, wherein
an end A11 of said sub-winding A1 and an end A21 of said sub-winding A2 are on the same column;
the other end A12 of said sub-winding A1 and the other end A22 of said sub-winding A2 are on the same column;
an end B11 of said sub-winding B1 and an end B21 of said sub-winding B2 are on the same column;
the other end B12 of said sub-winding B1 and the other end B22 of said sub-winding B2 are on the same column;
an end C11 of said sub-winding C1 and an end C21 of said sub-winding C2 are on the same column; and
the other end C12 of said sub-winding C1 and the other end C22 of said sub-winding C2 are on the same column.

10. The motor of claim 9, wherein
said first terminals (33) on the first row and the second row of said first plug (3) are connected altogether via a wire (8); and
said first terminals (33) on the third row and the fourth row of said first plug (3) are connected altogether via said wire (8).

11. The motor of claim 10, wherein said second terminals (43) on the second row and the third row of said second plug (4) are connected altogether via said wire (8).

* * * * *